United States Patent [19]

Davis et al.

[11] Patent Number: 4,557,913
[45] Date of Patent: Dec. 10, 1985

[54] BORAX RECOVERY USING SODIUM METABORATE AND BORIC ACID INTERMEDIATES

[75] Inventors: Robert E. Davis; Wilbert J. Robertson, both of Oklahoma City, Okla.

[73] Assignee: Kerr-McGee Chemical Corporation, Oklahoma City, Okla.

[21] Appl. No.: 640,363

[22] Filed: Aug. 13, 1984

[51] Int. Cl.⁴ .............................................. C01B 35/12
[52] U.S. Cl. ..................................... 423/279; 423/283
[58] Field of Search ................................. 423/279, 283

[56] References Cited

U.S. PATENT DOCUMENTS

| | | | |
|---|---|---|---|
| 1,350,090 | 8/1920 | Wrinkle et al. | 423/202 |
| 2,528,481 | 10/1950 | Wiseman et al. | 423/190 |
| 2,540,648 | 2/1951 | Blackmun | 423/188 |
| 3,111,383 | 11/1963 | Garrett et al. | 423/283 |
| 3,424,563 | 1/1969 | Grinstead | 423/276 |
| 3,433,604 | 3/1969 | Grinstead | 423/157 |
| 3,438,726 | 4/1969 | Russell et al. | 423/283 |
| 3,493,349 | 2/1970 | Shiappa et al. | 423/280 |
| 3,741,731 | 6/1973 | Peterson | 23/312 R |
| 3,812,238 | 5/1974 | Grannen | 23/312 R |
| 3,829,553 | 8/1974 | Lynn | 423/279 |
| 3,839,222 | 10/1974 | Grannen | 252/364 |
| 4,022,871 | 5/1977 | Demillie | 423/283 |
| 4,246,246 | 1/1981 | Nakamura | 423/263 |
| 4,261,961 | 4/1981 | Davis | 423/181 |

OTHER PUBLICATIONS

Dyressen et al., 46 Anal. Chem. Acta, pp. 55-61, (1969).
Basol et al., Proc. of the Internat'l Solvent Extraction Conference, CIM Special, vol. 21, pp. 443-446 (Sep. 1977).
Ayers, et al., 43 J. Inorg. Nucl. Chem., pp. 2097-2100, (1981).

Primary Examiner—John Doll
Assistant Examiner—Jackson Leeds
Attorney, Agent, or Firm—William G. Addison

[57] ABSTRACT

Sodium metaborate is recovered from a boron-containing first feed solution by extraction of the first feed solution with a 1,3-diol, followed by re-extraction with a solution of an alkali metal hydroxide. Boric acid is recovered from a boron-containing second feed solution by extraction of the second feed solution with a water-insoluble aromatic polyol, followed by re-extraction with mineral acid. The boric acid and sodium metaborate are reacted to form sodium tetraborate. By exchanging sodium ions in the polyol extract with potassium ions, the potassium salts of the mineral acid may be recovered from the polyol as a by-product.

23 Claims, 2 Drawing Figures

BORAX RECOVERY USING SODIUM METABORATE AND BORIC ACID INTERMEDIATES

FIELD OF THE INVENTION

The present invention relates generally to a process for the recovery of sodium tetraborate from aqueous boron-containing solutions, and more particularly to such a process utilizing sodium metaborate and boric acid intermediates.

SUMMARY OF THE INVENTION

A boron-containing first feed solution having a pH of between about 5 and about 8 is contacted in a first separation zone with an aliphatic 1,3-diol to produce a boron-rich first organic phase and a boron-depleted first aqueous phase. The first organic phase is separated from the first aqueous phase and extracted with an aqueous alkaline solution comprising an alkali metal hydroxide in a second separation zone, to produce a second aqueous phase rich in sodium metaborate and a boron-depleted second organic phase, which are separated.

A boron-containing second feed solution having a pH of greater than about 7 is contacted, in a third separation zone, with a water-insoluble aromatic polyol to produce a boron-depleted third aqueous phase and a boron-rich third organic phase, which are separated. The third organic phase is contacted with a mineral acid in a fourth separation zone to produce a fourth aqueous phase rich in boric acid and a boron-depleted fourth organic phase, which are separated.

Boric acid from the fourth aqueous phase is reacted with sodium metaborate from the second aqueous phase to produce a fifth aqueous phase rich in sodium tetraborate.

DESCRIPTION OF THE PREFERRED EMBODIMENT

The process of the present invention involves treatment of a boron-containing first feed solution and a boron-containing second feed solution, which preferably are separated from the same alkaline boron-containing solution, which preferably comprises a boron-containing brine also containing sodium carbonate, such as brine from Searles Lake, Calif. While the first and second feed solutions preferably are derived from the same source solution, it should be understood that the feed solutions also may be derived from different sources.

Figure 1:
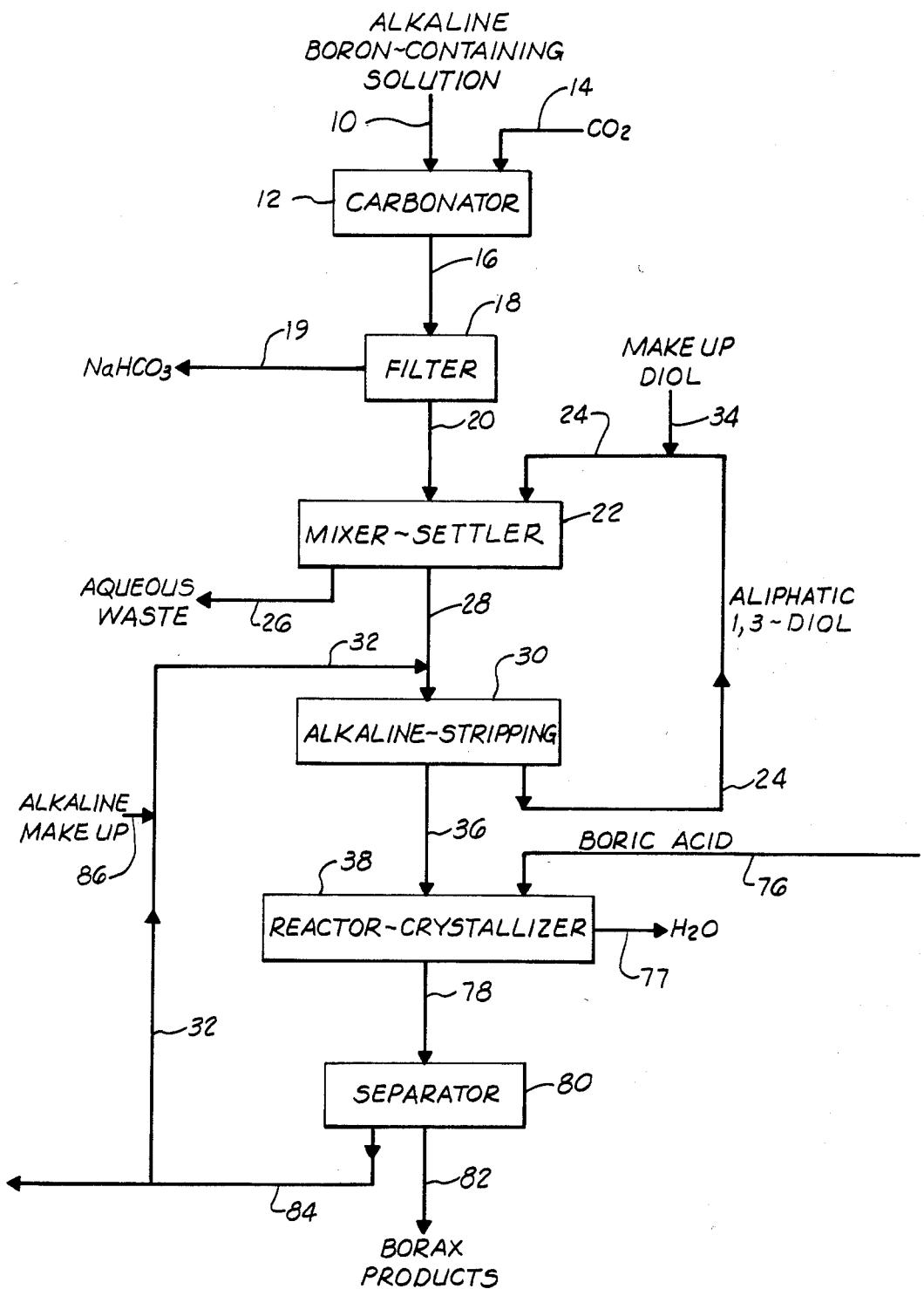
FIG. 1 is a schematic drawing depicting a portion of the flow of materials in the process of the present invention, showing the production of a sodium metaborate intermediate from a boron-containing solution, and reaction of the sodium metaborate intermediate with a boric acid intermediate to produce sodium tetraborate.

When the first feed solution is alkaline, as shown in FIG. 1, the first feed solution is introduced into a carbonation zone 12, via conduit 10. A gas comprising carbon dioxide, and preferably consisting essentially of pure carbon dioxide, is introduced into the carbonation zone 12 via a conduit 14. This gas preferably is maintained at a pressure elevated above about atmospheric pressure. The feed solution is treated with carbon dioxide in the carbonation zone 12 to produce a carbonated solution having a pH between about 5 and about 8, and preferably between about 6 and about 7. The carbonation zone 12 preferably comprises a continuous carbonation process apparatus, comprising vessels or columns.

The feed solution and carbon dioxide in the carbonation zone 12 preferably are maintained at temperatures of from about 50° C. to about 70° C. The liquid residence time in the carbonation zone 12, computed by liquid volume divided by liquid flow rate, is preferably between about 30 minutes and about 90 minutes, and is most preferably about 60 minutes. The treatment of the feed solution in the carbonation zone 12 with carbon dioxide under these preferred conditions ensures dissolution of sufficient carbon dioxide in the feed solution to produce a carbonated solution having a pH in the designated range of between about 5 and about 8.

As shown in FIG. 1, after completion of the carbonation step in the carbonation zone 12, the carbonated solution is transferred, via a conduit 16, to a bicarbonate separation zone 18. Solid sodium bicarbonate is separated from the carbonated solution in the bicarbonate separation zone 18, to produce a carbonated solution which is substantially free of sodium bicarbonate. The separation step may be carried out by centrifugation or settling, but more preferably is carried out by filtration. A Bird-Young filter is the most preferred means of filtration. The separated sodium bicarbonate is removed from the bicarbonate separation zone 18 via a conduit 19. The separated sodium bicarbonate may be used as a source of carbon dioxide for introduction into the carbonation zone 12 or into the first separation zone to be described hereafter. To produce carbon dioxide, the sodium bicarbonate may be decomposed thermally in aqueous solution, or it may be calcined after crystallization and separation.

The bicarbonate separation step produces a carbonated first feed solution which is substantially free of sodium bicarbonate. Without such bicarbonate separation, sodium bicarbonate crystals could interfere with transfer of liquids in subsequent process steps. In the event that the first feed solution is characterized by a low bicarbonate content, as may be the case if the first feed solution has been pretreated by carbonation and filtration, it may be possible to dispense with the bicarbonate separation step.

In the preferred embodiment of the present invention, the first feed solution is alkaline, and accordingly must be acidified to a pH of between about 5 and about 8 prior to subsequent steps of the present invention. However, in the event that the untreated first feed solution is characterized by a pH of between about 5 and about 8, it may be possible to dispense with the carbonation and bicarbonate separation steps.

After completion of the separation step in the bicarbonate separation zone 18, the carbonated solution is transferred, via a conduit 20, to a first separation zone 22, which preferably comprises a suitable solvent extraction apparatus, such as at least one and preferably a plurality of serially disposed mixer-settlers, centrifugal extractors, plate towers, packed towers, pulse columns, pumper decanters, Podbielniak contactors, or similar equipment used for liquid-liquid contact and separation. In the first separation zone 22, the carbonated solution is contacted, preferably in a countercurrent manner, with an aliphatic 1,3-diol, which most preferably is a substantially water-insoluble aliphatic 1,3-diol. The 1,3-diol preferably is dissolved in a substantially water-insoluble organic solvent, which preferably comprises an aromatic kerosene.

The aliphatic 1,3-diol is introduced into the separation zone 22 via a conduit 24, which will be discussed more fully hereafter. The contact of the aliphatic 1,3-diol with the carbonated solution may be carried out in the presence of an atmosphere consisting essentially of carbon dioxide, which preferably is maintained at a pressure elevated above about atmospheric pressure. This atmosphere suppresses foaming of the carbonated solution and controls the loss of dissolved carbon dioxide from the carbonated solution.

Water-insoluble aliphatic 1,3-diols suitable for use in the process of this invention include: 2-ethyl-1,3-hexanediol, 3-methyl-2,4-heptanediol, 2,2,4-trimethyl-1,3-pentanediol, 2-butyl-2-hexyl-1,3-propanediol, 2-methyl-2-nonyl-1,3-propanediol, 2-methyl-2(octylthio)methyl-1,3-propanediol, 2,2-diamyl-1,3-propanediol, 2-butyl-1,3-octanediol, 3-methyl-2,4-undecanediol, 6-ethyl-3,5-decanediol, 5-ethyl-3-methyl-2,4-nonanediol, 2-butyl-2-ethyl-1,3-propanediol and 2,4-diethyl-2-butyl-1,3-octanediol.

The contacting step in the first separation zone 22, which preferably is maintained at temperatures between about 15° C. and about 30° C., preferably is accompanied by agitative stirring or shaking of liquids in the first separation zone 22. Alternately, the contacting step may be carried out by countercurrent flow between the carbonated solution and the aliphatic 1,3-diol. The agitation or countercurrent flow enhances contact between the two liquids, and thereby promotes extraction of boron values from the carbonated solution into the aliphatic 1,3-diol. This agitation or countercurrent flow is carried out for a period of between about 0.2 minutes and about 2 minutes. After this agitation or countercurrent flow has ended, the contents of the first separation zone 22 are permitted to rest for a period of between about 2 minutes and about 10 minutes, until a boron-depleted first aqueous phase and a boron-rich first organic phase form in separate layers in the first separation zone 22.

With continued reference to FIG. 1, the first aqueous phase is separated from the first organic phase and is transferred via a conduit 26 to a waste disposal area or to further processing. The boron-rich first organic phase, comprising a boron-rich extractant, is transferred via a conduit 28 to a second separation zone 30, which preferably comprises a suitable solvent extraction apparatus, such as at least one and preferably a plurality of serially disposed mixer-settlers, centrifugal extractors, plate towers, packed towers, pulse columns, pumper decanters, Podbielniak contactors, or similar equipment utilized for liquid-liquid contact and separation.

In the second separation zone 30, the boron-rich first organic phase is contacted with an aqueous solution of an alkali metal hydroxide. The aqueous solution of alkali metal hydroxide, preferably comprising sodium hydroxide solution, preferably is characterized by a pH between about 9 and about 13, and is introduced into the second separation zone 30 via a conduit 32, to be discussed more fully hereafter.

The contacting step in the second separation zone 30, which preferably is maintained at a temperature between about 15° C. and about 30° C., preferably is accompanied by agitative stirring or shaking of liquids in the second separation zone 30, or by countercurrent flow between the first organic phase and the aqueous alkaline solution. The countercurrent flow or agitation enhances contact between the two liquids, and thereby promotes extraction of boron values from the first organic phase into the aqueous alkaline solution. This agitation or countercurrent flow is carried out for a period of between about 0.2 minutes and about 2 minutes. After this agitation or countercurrent flow has ended, the contents of the second separation zone 30 are permitted to rest for a period of time between about 2 minutes and about 30 minutes, until a boron-depleted second organic phase and a boron-rich second aqueous phase form in separate layers in the second separation zone 30.

As shown in FIG. 1, the second aqueous phase is separated from the second organic phase. At least a portion of the second organic phase, comprising a boron-depleted 1,3-diol extractant is recycled, via conduit 24 to the first separation zone 22 for reuse as an aliphatic 1,3-diol in the extraction of boron values from the carbonated solution. The recycled second organic phase may be supplemented by makeup aliphatic 1,3-diol provided via a conduit 34. The boron-rich second aqueous phase is transferred via a conduit 36, from the second separation zone 30 to a reaction zone 38.

When alkali metal hydroxide is used as the stripping agent in the second separation zone, the boron values in the second aqueous phase comprise sodium metaborate. This sodium metaborate functions as an intermediate, in the process for producing sodium tetraborate of the present invention, as will be described in greater detail hereafter. A second intermediate in the process of the present invention is boric acid, the production of which now will be described.

Figure 2:
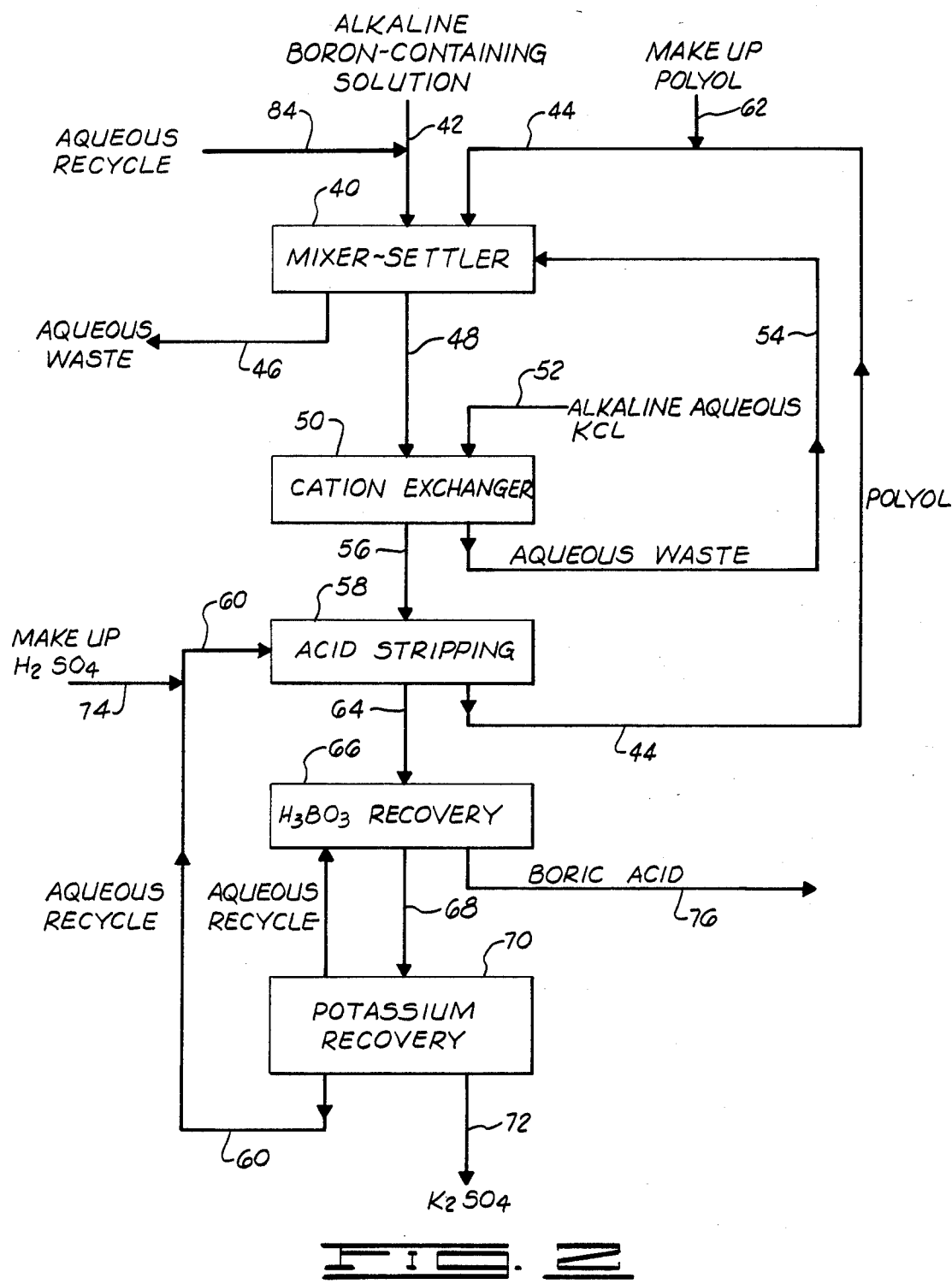
FIG. 2 is a schematic drawing depicting a portion of the flow of materials of the present invention, showing the production of the boric acid intermediate utilized in that portion of the process shown in FIG. 1.

With reference to FIG. 2, a boron-containing second feed solution having a pH above about 7, is introduced into a third separation zone 40 via a conduit 42. While the second feed solution preferably comprises a naturally occurring alkaline boron-containing solution, it may also be prepared by treating an acidic boron-containing solution with an alkaline agent, such as caustic soda or soda ash. The third separation zone 40 comprises a suitable solvent extraction apparatus such as at least one and preferably a plurality of serially disposed mixer-settlers, centrifugal extractors, plate towers, packed towers, pulse columns, pumper decanters, Podbielniak contactors, or similar equipment utilized for liquid-liquid contact and separation.

In the third separation zone 40, the second feed solution is contacted extractively, preferably under alkaline conditions, with a water-insoluble aromatic polyol, to produce a boron-depleted third aqueous phase and a boron-rich third organic phase. The water-insoluble aromatic polyol is introduced into the third separation zone 40 via a conduit 44. Suitable polyols include phenylglycols, glycerol ethers of aromatic compounds, 1,2-aromatic diols and 1,8- and 1,10-fused ring aromatic diols. A preferred water-insoluble polyol is 4-nonyl-6-chlorosaligenin. The water-insoluble aromatic polyol preferably is dissolved in a substantially water-insoluble organic solvent, such as kerosene.

The contacting step in the third separation zone 40, which preferably is maintained at temperatures between about 15° C. and about 30° C., preferably is accompanied by agitative stirring or shaking of liquids in the third separation zone 40. Alternately, the contacting step may be carried out by countercurrent flow between the second feed solution and the polyol. The agitation or countercurrent flow enhances contact between the two liquids, and thereby promotes extraction of boron values from the second feed solution into the polyol. This agitation or countercurrent flow is carried out for a period of between about 4 minutes and about 10 minutes. After this agitation or countercurrent flow has ended, the contents of the third separation zone 40 are permitted to rest for a period of between about 15 minutes and about 90 minutes, until a boron-depleted third aqueous phase and a boron-rich third organic phase form in separate layers in the third separation zone 40.

With continued reference to FIG. 2, the third aqueous phase is separated from the third organic phase and is transferred via a conduit 46 to a waste disposal area or to further processing. The third organic phase, comprising a boron-rich extractant, is transferred via a conduit 48 to a cation exchange zone 50, which preferably comprises a suitable solvent extraction apparatus, such as at least one, and preferably a plurality of serially disposed mixer-settlers, centrifugal extractors, plate towers, packed towers, pulse columns, pumper decanters, Podbielniak contactors, or similar equipment utilized for liquid-liquid contact and separation.

In the cation exchange zone 50 the third organic phase is contacted, preferably in a countercurrent manner, with an aqueous solution rich in potassium ions. This contacting step produces a potassium-rich third organic phase and a potassium-depleted aqueous solution, by way of exchange of potassium cations in the aqueous solution with sodium cations in the third organic phase. The aqueous solution rich in potassium ions preferably is alkaline, and preferably comprises an aqueous potash solution, which is supplemented as required by potassium chloride to produce a potassium ion concentration approximately greater than or equal to the sodium ion concentration in the third organic phase. The aqueous solution rich in potassium ions preferably is introduced into the cation exchange zone 50 via a conduit 52.

The contacting step in the cation exchange zone 50, which preferably is maintained at temperatures between about 15° C. and about 30° C., preferably is accompanied by agitative stirring or shaking of liquids in the cation exchange zone 50. Alternately, the contacting step may be carried out by countercurrent flow between the third organic phase and the aqueous solution rich in potassium ions. The agitation or countercurrent flow enhances contact between the two liquids, and thereby promotes cation exchange. This agitation or countercurrent flow is carried out for a period of between about 0.5 minutes and about 10 minutes. After this agitation or countercurrent flow has ended, the contents of the cation exchange zone 50 are permitted to rest for a period of between about 2 minutes and about 30 minutes, until a potassium-rich third organic phase and a potassium-depleted aqueous solution form in separate layers in the cation exchange zone 50.

As shown in FIG. 2, the potassium-depleted aqueous phase is separated from the potassium-rich third organic phase and is transferred via a conduit 54 to the third separation zone 40, and thereafter via conduit 46 to the waste disposal area described previously. The potassium-rich third organic phase is transferred via a conduit 56 to a fourth separation zone 58, which comprises a suitable solvent extraction apparatus, such as at least one, and preferably a plurality of serially disposed mixer-settlers, centrifugal extractors, plate towers, packed towers, pulse columns, pumper decanters, Podbielniak contactors, or similar equipment utilized for liquid-liquid contact and separation.

In the fourth separation zone 58, the third organic phase is contacted with mineral acid to produce a fourth aqueous phase rich in boric acid and a boron-depleted fourth organic phase. The mineral acid is introduced into the fourth separation zone 58 via a conduit 60, to be discussed in greater detail hereafter. Preferably, the mineral acid is in aqueous solution, and more preferably the mineral acid comprises an aqueous solution of sulfuric acid.

The contacting step in the fourth separation zone 58, which preferably is maintained at a temperature between about 15° C. and about 30° C., preferably is accomplished by agitative stirring or shaking of liquids in the fourth separation zone 58, or by countercurrent flow between the third organic phase and the mineral acid. The countercurrent flow or agitation enhances contact between the two liquids, and thereby promotes extraction of boron values from the third organic phase into the mineral acid. This agitation or countercurrent flow is carried out for a period of between about 0.2 minutes and about 10 minutes. After this agitation or countercurrent flow has ended, the contents of the fourth separator zone 58 are permitted to rest for a period of time of between about 2 minutes and about 30 minutes, until a boron-depleted fourth organic phase and a fourth aqueous phase rich in boric acid form in separate layers in the fourth separation zone 58.

As shown in FIG. 2, the fourth aqueous phase is separated from the fourth organic phase. At least a portion of the fourth organic phase, comprising boron-depleted polyol extractant, is recycled via conduit 44 for reuse as polyol in the extraction of boron values from the second feed solution in the third separation zone 40. The recycled fourth organic phase may be supplemented by makeup polyol provided via a conduit 62.

The fourth aqueous phase preferably is transferred via a conduit 64 to a boric acid recovery zone 66, where boric acid is recovered from the fourth aqueous phase to produce solid boric acid and a boron-depleted, potassium-rich sixth aqueous phase. The boric acid recovery zone 66 preferably comprises a crystallizer, in which the fourth aqueous phase is treated by crystallizing techniques, such as cooling, evaporation or a combination thereof, to produce boric acid crystals and the sixth aqueous phase. The boric acid recovery zone 66 preferably further comprises a centrifuge, or one or more filters or settling tanks, in which solid boric acid is separated from the sixth aqueous phase.

With continued reference to FIG. 2, recovered boric acid is withdrawn from the boric acid recovery zone 66 via a conduit 76. The boron-depleted sixth aqueous phase is withdrawn from the boric acid recovery zone 66 via a conduit 68 and is transferred to a potassium recovery zone 70, which preferably comprises a crystallizer. In the potassium recovery zone 70, the sixth aqueous phase preferably is treated by crystallizing techniques, such as cooling, evaporation or a combination thereof, to produce a recoverable solid phase, comprising the potassium salt of the mineral acid, and a mineral-depleted seventh aqueous phase. The potassium recovery zone 70 further comprises a centrifuge, or one or more filters or settling tanks, in which solid potassium values are separated from the seventh aqueous phase.

Solid potassium values are dried and withdrawn from the potassium separation zone via conduit 72.

With continued reference to FIG. 2, one portion of the seventh aqueous phase is recycled to the boric acid recovery zone 66. Another portion of the seventh aqueous phase may be withdrawn from the potassium recovery zone 70 and introduced into conduit 60. Makeup mineral acid is introduced into conduit 60 through conduit 72, to produce an aqueous solution of mineral acid for use in the extraction step carried out in the fourth separation zone 58.

Returning to FIG. 1, boric acid from the fourth aqueous phase, preferably in the form of solid boric acid, is transferred to the reaction zone 38 via conduit 76. In the reaction zone 38, boric acid from the fourth aqueous phase reacts with the sodium metaborate in the second aqueous phase to produce a fifth aqueous phase rich in sodium tetraborate.

The reaction zone 38 preferably comprises a crystallizer, in which the products of the reaction between the second aqueous phase and boric acid are treated by crystallization techniques, such as cooling, evaporation, or a combination thereof, to produce a recoverable solid phase, comprising sodium tetraborate hydrate, and a fifth aqueous phase. Water is withdrawn from the reaction zone 38 via a conduit 77. After crystallization is substantially complete, the crystallized sodium tetraborate hydrate and the fifth aqueous phase are transferred from the reaction zone 38 via a conduit 78 to a product separation zone 80, preferably comprising a centrifuge. Alternately, the product separation zone 80 may comprise one or more filters or settling tanks. In the product separation zone 80, the recoverable solid phase comprising sodium tetraborate hydrate is separated from the boron-depleted fifth aqueous phase.

As shown in FIG. 1, recovered solid sodium tetraborate hydrate is withdrawn from the product separation zone 80 via a conduit 82. The boron-depleted fifth aqueous phase is withdrawn from the product separation zone 80 via a conduit 84. With some feed solutions, after repeated recycling in accordance with the present invention, certain salts, such as alkali sulfates and chlorides, may become so concentrated in the aqueous phases as to co-crystallize with boron products and thereby decrease the purity of these boron products. In order to avoid this buildup of impurities, a small portion of the fifth aqueous phase may be withdrawn and transferred to a waste disposal area or to further processing. The volume of liquid withdrawn is adjusted to maintain the level of these impurities in the fifth aqueous phase at a level not co-crystallizing with boron products.

At least a portion of the fifth aqueous phase flows from conduit 84 into conduit 32, where the fifth aqueous phase is supplemented with alkaline material, and more preferably with the same alkaline material contained in the aqueous alkali metal hydroxide solution introduced into the second separation zone 24 (sodium hydroxide in the preferred embodiment of the process of this invention). Makeup alkaline material is provided via a conduit 86 until the pH of the supplemented fifth aqueous phase is between about 9 and about 12. The supplemented fifth aqueous phase is recycled, via conduit 32, to the second separation zone 30, where the supplemented fifth aqueous phase functions as the aqueous alkaline solution which extracts boron values from the first organic phase. If necessary, makeup water may be added to the fifth aqueous phase, in order to produce the required volume for the recycled solution.

That portion, if any, of the fifth aqueous phase not recycled to the second separation zone 30 is recycled via conduit 84 to the third separation zone 40, and then to the waste disposal area via conduit 46.

Particular parameters of temperature, pressure, stream concentration, flow rate and pH level for the process of the present invention may be selected to provide optimum boron product recovery from the boron-containing feed solution chosen for recovery of boron values. These parameters are selected based upon solubilities and distribution coefficient data as required to optimize boron recoveries. Examples of laboratory distribution coefficient data are given by D. Dyrssen and L. Upptrom [Anal. Chem. Acta, 46 (1969) 55–61].

Either decahydrate or pentahydrate borax salts, or both, may be produced in accordance with the process of the present invention. The type of borax salt or salts produced may be controlled by adjustment of conditions such as temperature and flow rate in the reaction zone 38.

It will be noted that the process of the present invention permits the conversion of the sodium metaborate product produced in the second separation zone 30 to commercially valuable sodium tetraborate, without the reagent costs which would be associated with direct acid neutralization of the sodium metaborate. This is accomplished by utilizing a second solvent extraction circuit to acid, and by reacting the boric acid thus produced with the sodium metaborate to produce sodium tetraborate. The process offers the additional advantage of permitting use of the second solvent extraction circuit to recover potassium by-products, as well as the boric acid intermediate.

Changes may be made in the construction, operation and arrangement of the various parts, elements, steps and procedures described herein without departing from the spirit and scope of the invention as defined in the following claims.

What is claimed is:

1. A process for recovering sodium tetraborate from boron-containing feed solutions which comprises:
    contacting a first feed solution having a pH of between about 5 and about 8 in a first separation zone with an aliphatic 1,3-diol to produce a boron-rich first organic phase and a boron-depleted first aqueous phase;
    separating the first aqueous phase from the first organic phase;
    extracting the boron values from the boron-rich first organic phase with an aqueous solution comprising an alkali metal hydroxide in a second separation zone, to produce a second aqueous phase rich in sodium metaborate and a boron-depleted second organic phase;
    separating the second aqueous phase from the second organic phase;
    contacting a second feed solution having a pH of greater than about 7 with a water-insoluble aromatic polyol in a third separation zone, to produce a boron-depleted third aqueous phase and a boron-rich third organic phase;
    separating the third aqueous phase from the third organic phase;
    contacting the third organic phase with mineral acid in a fourth separation zone, to produce a fourth aqueous phase rich in boric acid and a boron-depleted fourth organic phase;

separating the fourth aqueous phase from the fourth organic phase; and reacting sodium metaborate from the second aqueous phase with boric acid from the fourth aqueous phase to produce a fifth aqueous phase rich in sodium tetraborate.

2. The process of claim 1 further comprising:

recovering boric acid from the fourth aqueous phase to produce solid boric acid and a boron-depleted sixth aqueous phase; and in which the boric acid reacted with sodium metaborate comprises solid boric acid recovered from the fourth aqueous phase.

3. The process of claim 2 wherein at least a portion of the sixth aqueous phase is recycled to the fourth separation zone.

4. The process of claim 1 further comprising:

separating sodium tetraborate from the fifth aqueous phase.

5. The process of claim 4 in which the separation of sodium tetraborate from the fifth aqueous phase is carried out by crystallization.

6. The process of claim 1 in which the third organic phase, prior to its treatment in the fourth separation zone, is contacted with an aqueous solution rich in potassium ions, to produce a potassium-rich third organic phase and a potassium-depleted aqueous solution.

7. The process of claim 6 further comprising:

separating the potassium-depleted aqueous solution from the potassium-rich third organic phase prior to treatment of the potassium-rich third organic phase in the fourth separation zone.

8. The process of claim 6 in which the mineral acid comprises sulfuric acid.

9. The process of claim 6 further comprising;

recovering boric acid from the fourth aqueous phase to produce solid boric acid and a potassium-rich sixth aqueous phase.

10. The process of claim 9 further comprising:

recovering the potassium salt of the mineral acid from the sixth aqueous phase, to produce a solid potassium salt and a mineral-depleted seventh aqueous phase.

11. The process of claim 1 in which at least a portion of the fourth organic phase is recycled to the third separation zone.

12. The process of claim 1 in which the aliphatic 1,3-diol is substantially water-insoluble.

13. The process of claim 12 in which the aliphatic 1,3-diol is dissolved in a substantially water-insoluble organic solvent.

14. The process of claim 1 in which the first feed solution comprises an acidified brine solution.

15. The process of claim 14 in which the brine solution is substantially free of sodium bicarbonate.

16. The process of claim 1 further comprising:

recycling the second organic phase to the first separation zone.

17. The process of claim 16 in which the recycled second organic phase provides at least a portion of the aliphatic 1,3-diol for carrying out the contacting step in the first separation zone.

18. The process of claim 1 in which the aqueous alkaline solution has a pH of between about 9 and about 13.

19. The process of claim 1 in which the first feed solution has a pH of between about 6 and about 7.

20. The process of claim 1 in which the first feed solution is prepared by treating an alkaline boron-containing solution with carbon dioxide.

21. The process of claim 1 in which the first and second feed solutions are prepared by:

dividing an alkaline boron-containing solution into first and second feed solutions; and treating the first feed solution with carbon dioxide prior to its introduction into the first separation zone.

22. The process of claim 1 in which the second feed solution is prepared by treating an acidic boron-containing solution with an alkaline agent.

23. The process of claim 1 in which the first and second feed solutions are prepared by:

dividing an acidic boron-containing solution into first and second feed solutions; and treating the second feed solution with an alkaline agent.

* * * * *